(12) United States Patent
Dell et al.

(10) Patent No.: US 6,446,184 B2
(45) Date of Patent: *Sep. 3, 2002

(54) ADDRESS RE-MAPPING FOR MEMORY MODULE USING PRESENCE DETECT DATA

(75) Inventors: Timothy Jay Dell, Colchester; Mark William Kellogg, Essex Junction, both of VT (US)

(73) Assignee: International Business Machines Corporation, Armonk, NY (US)

(*) Notice: Subject to any disclaimer, the term of this patent is extended or adjusted under 35 U.S.C. 154(b) by 8 days.

This patent is subject to a terminal disclaimer.

(21) Appl. No.: 09/772,685

(22) Filed: Jan. 30, 2001

Related U.S. Application Data

(63) Continuation-in-part of application No. 09/067,549, filed on Apr. 28, 1998, now Pat. No. 6,209,074.

(51) Int. Cl.⁷ .............................................. G06F 12/00
(52) U.S. Cl. ..................... 711/170; 711/5; 711/101; 711/103; 711/115; 711/171; 711/172
(58) Field of Search .................... 711/5, 115, 101, 711/170–172, 103; 713/1, 2

(56) References Cited

U.S. PATENT DOCUMENTS

| | | | |
|---|---|---|---|
| 5,307,320 A | 4/1994 | Farrer et al. ............ 365/230.01 |
| 5,379,304 A | 1/1995 | Dell et al. .................. 371/40.1 |
| 5,390,308 A | 2/1995 | Ware et al. .................. 395/400 |
| 5,412,788 A | 5/1995 | Collins et al. .............. 395/425 |
| 5,450,422 A | 9/1995 | Dell ......................... 371/40.1 |
| 5,579,522 A | * 11/1996 | Christeson et al. ............ 713/2 |
| 5,745,914 A | 4/1998 | Connolly et al. ........... 711/105 |
| 5,765,188 A | 6/1998 | Cowell ....................... 711/115 |
| 5,897,663 A | 4/1999 | Stancil ....................... 711/200 |
| 6,173,382 B1 | * 1/2001 | Dell et al. .................. 711/170 |
| 6,209,074 B1 | * 3/2001 | Dell et al. .................. 711/170 |

* cited by examiner

Primary Examiner—Do Hyun Yoo
Assistant Examiner—Mehdi Namazi
(74) Attorney, Agent, or Firm—William N. Hogg

(57) ABSTRACT

A memory module comprising: a plurality of memory devices associated with the module; each of the memory devices being configured in M banks; and a logic circuit for configuring the memory module to operate in a programmable addressing mode; the logic circuit receiving a number of address inputs and a number of bank address signals from a memory controller with the address inputs and bank address input signals corresponding to N bank memory devices; the logic circuit re-mapping at least one of said address inputs as an additional bank address signal to the memory device or at least one of the bank address signals to a different device bank address.

9 Claims, 4 Drawing Sheets

US 6,446,184 B2

ADDRESS RE-MAPPING FOR MEMORY MODULE USING PRESENCE DETECT DATA

RELATED APPLICATIONS

This application is a continuation-in-part of U.S. application Ser. No. 09/067,549, now U.S. Pat. No. 6,209,074 B1, filed Apr. 28, 1998, for "Address Re-Mapping for Memory Module Using Presence Detect Data", and is related to the following applications: U.S. application Ser. No. 09/067,420, now U.S. Pat. No. 6,173,382, entitled "Dynamic configuration of memory Module Using Presence Detect Data", filed Apr. 28, 1998 (Docket BU9-97-139); U.S. application Ser. No. 08/598,857, now U.S. Pat. No. 5,926,827, entitled "High Density SIMM or DIMM with RAS Address Re-Mapping", filed Feb. 9, 1996 (Docket BU9-95-095); and U.S. application Ser. No. 08/582,080, now U.S. Pat. No. 5,838,122, entitled "Method and Apparatus for Modifying Signals Received by memory Cards", filed Jan. 2, 1996 (Docket BU9-96-057).

FIELD OF THE INVENTION

The invention relates generally to memory modules for computer systems. More particularly, the invention relates to address re-mapping techniques such as, for example, for system level negotiation of an addressing mode of a memory module by dynamic control of the presence detect data.

BACKGROUND OF THE INVENTION

Computer memory comes in two basic forms: Random Access Memory (hereinafter RAM) and Read-Only Memory (hereinafter ROM). RAM is generally used by a processor for reading and writing data. RAM memory is volatile typically, meaning that the data stored in the memory is lost when power is removed. ROM is generally used for storing data which will never change, such as the Basic Input/Output System (hereinafter BIOS). ROM memory is non-volatile typically, meaning that the data stored in the memory is not lost even if power is removed from the memory.

Generally, RAM makes up the bulk of the computer system's memory, excluding the computer system's harddrive, if one exists. RAM typically comes in the form of dynamic RAM (hereinafter DRAM) which requires frequent recharging or refreshing to preserve its contents. Organizationally, RAM data is typically arranged in bytes of eight data bits. An optional ninth bit, a parity bit, acts as a check on the correctness of the values of the other eight bits.

As computer systems become more advanced, there is an ever increasing demand for DRAM memory capacity consequently, DRAM memory is available in module form, in which a plurality of memory chips are placed on a small circuit card, which card then plugs into a memory socket connected to the computer motherboard or memory carrier card.

Examples of commercial memory modules are SIMMs (Single In-line Memory Modules) and DIMMs (Dual In-line Memory Modules)

In addition to an ever increasing demand for DRAM capacity, different computer systems may also require different memory operating modes. Present memories are designed with different modes and operational features, such as fast page mode (FPM), extended data out (EDO), synchronous DRAM (SDRAM), double data rate SDRAM (DDR SDRAM), parity and non-parity, error correcting (ECC) and non error correcting, to name a few. Memories also are produced with a variety of performance characteristics, such as access speeds, refresh times and so on. Further still, a wide variety of basic memory architectures are available with different device organizations, addressing requirements and logical banks. As a result, some memory modules may or may not have features that are compatible with a particular computer system.

In order to address some of the problems associated with the wide variety of memory chip performance, operational characteristics and compatibility with system requirements, memory modules are being provided with presence detect (PD) data. PD data is stored in a non-volatile memory, such as an electrically erasable programmable read-only memory (EEPROM) on the memory module. A typical PD data structure includes 256 eight bit bytes of information. Bytes 0 through 127 are generally locked by the manufacturer, while bytes 128 through 255 are available for system use. Bytes 0–35 are intended to provide an in-depth summary of the memory module architecture, allowable functions and important timing information. PD data can be read in parallel or series form, but serial PD (SPD) is already commonly in use. SPD data is serially accessed by the system memory controller during boot up across a standard serial bus, such as an I²C™ bus (hereinafter referred to as a I2C bus). The system controller then determines whether the memory module is compatible with the system requirements and, if it is, will complete a normal boot. If the module is not compatible, an error message may be issued, or other action taken.

Some memory devices have the memory cells organized into a number of logical banks which can be individually addressed by the system memory controller. Control of bank selection is accomplished through the use of one or more Bank Address (BA) inputs. If the memory device bank organization is not the same as the system level addressing scheme, the memory module may be incompatible with the system requirements. For example, the system may need a two bank memory chip, but the memory module may include a memory device that is a four bank device.

It is desired, therefore, to provide a memory module that is more flexible in terms of its compatibility with different computer systems, and particularly that permits the computer system dynamically to negotiate available memory module functions and modes, especially an address re-mapping function.

SUMMARY OF THE INVENTION

The present invention contemplates, in one embodiment, a memory module that includes a plurality of memory devices associated with the module; each of said memory devices being configured as M banks; and a logic circuit for configuring the memory module to operate in a programmable addressing mode; said logic circuit receiving a number of address inputs and a number of bank address signals from a memory controller with said address inputs and bank address input signals corresponding to N bank memory devices; said logic circuit re-mapping at least one of said address inputs or bank address inputs as an additional bank address signal to the memory device.

The invention also contemplates the methods embodied in the use of such a memory module and, in another embodiment, a method for using an M bank memory device in a computer system that has N bank addressing, comprising the steps of:

a) inputting address signals from a system controller to a logic circuit, said address signals including a number of address inputs and a number of bank address signals;

b) re-mapping at least one of said address inputs as an additional bank address signal; and c) providing said address inputs, bank address signals and said additional bank address signals as inputs to the memory device.

These and other aspects and advantages of the present invention will be readily understood and appreciated by those skilled in the art from the following detailed description of a preferred embodiments with the best mode contemplated for practicing the invention in view of the accompanying drawings.

DETAILED DESCRIPTION OF THE INVENTION

Figure 1:
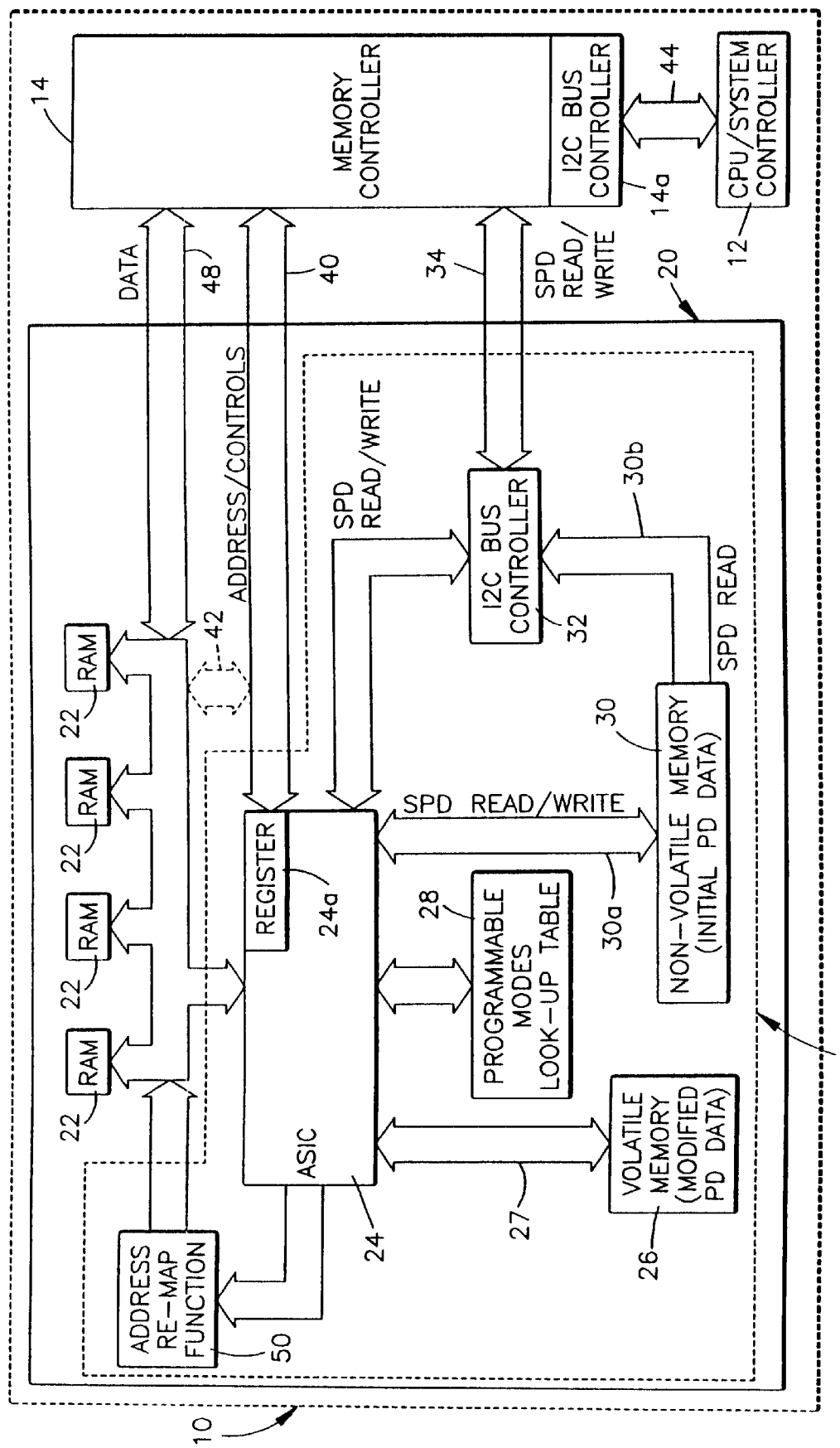
FIG. 1 is a functional block diagram of a memory module for a computer system in accordance with the present invention.

With reference to FIG. 1, an embodiment of the invention is illustrated in the environment of a computer system 10. The computer system 10 can be any computer system that utilizes a memory module having presence detect (PD) data and programmable or selectable memory module functions and modes. Personal computer systems, such as an IBM APTIVA* or IBM PC-300™, could be used for the computer system 10, to name just two of many examples. The computer system includes a CPU or system controller 12 which can include or be interfaced to a system memory controller 14. In this embodiment, the computer system 10 further includes a memory module 20, as will be further described hereinafter. The memory controller 14 provides address, data and bus control signals for interfacing the CPU 12 and the memory module 20. The memory controller 14 includes logic for addressing, receiving, writing and refreshing data in the plurality of memory devices 22 on the memory module 20.

In accordance with one aspect of the invention, the memory module 20 is of the type that can be generally categorized as an "intelligent" module, in that the memory module 20 can operate in a plurality of selectable or programmable modes. The programmable feature of the memory module 20 is significantly advanced beyond the conventional mode selection criteria available by use of the Mode Register function of conventional memory chips, such as synchronous DRAMs (SDRAMs). The memory module 20 can include memory devices or chips such as, for example, SDRAMs with standard Mode Register functions, such as, for example, burst type, burst length and CAS Latency. Such chips are used today on memory modules, such as, for example, Dual Inline Memory Modules or DIMMs. Other module architecture, such as SIMMs, could also be used. However, these mode register functions alone do not provide the level of flexibility needed to allow system level control to optimally interface with a number of different memory chip 22 designs and memory module 20 capabilities.

In accordance with one aspect of the invention, the memory module 20 includes a logic circuit 24. In the embodiment, the logic circuit 24 is realized in the form of an application specific integrated circuit (ASIC). A suitable device for the ASIC 24 is a gate array ASIC, such as a TOSHIBA ASIC TC160G. Suitable SDRAM devices 22 are IBM 0316409CT3 available from IBM.

The ASIC 24 includes or communicates with a volatile memory 26 over a bus 27. The volatile memory 26 is used to store modified SPD data fields, as will be further explained herein.

The ASIC 24 further includes a look-up table 28 or comparable data set function that stores information about the programmable features of the memory module 20. The ASIC 24 can also receive inputs in the form of signals from jumper wires (not shown). The settings of the jumper wires can indicate various features of the memory chips 22, including, for example, whether the memory chips 22 are two bank, four bank or eight bank devices. Whether jumper inputs are used will be determined by the design of the memory module 20, and is not a requirement of the present invention. The present invention can be utilized in any memory module 20 that can detect or otherwise determine the memory device characteristics, either through jumpers or look-up tables or SPD data, to name a few examples.

The use of a logic circuit 24 provides the capability to include a number of system level programmable or selectable features or operating modes. For example, the ASIC 24 can be configured to allow the memory module 20 to operate in several addressing modes In one embodiment, the ASIC 24 effects an address re-mapping operation. This allows the system controller 12, for example, to select or request an addressing option that is compatible with a mode available on the memory module 20.

For example, SDRAM memories can include a number of internal banks of memory arrays. An ASIC can be configured to allow the use of a 4 bank SDRAM in a system that supports only 2 bank SDRAMs, by effecting an address re-mapping function. For clarity, the letter "M" will be used herein to represent an integer number of internal banks for the memory devices 22. Additionally, the letter "N" will be used herein to represent an integer number of banks that the system addressing function is expecting the memory devices 22 to have.

By way of example, suppose the memory module 20 has SDRAM devices installed for the memory devices 22. The ASIC 24 determines the configuration of the memory chips, such as the number of banks, either from jumper input signals, presence detect data, or information available in, for example, module memory 20 or a look-up table 28. The particular source of the bank configuration information to the ASIC 24 is not critical to the present invention. As will be further described hereinafter, if the system 12 requires an addressing mode that is different from the mode of the memory devices 22, the ASIC 22 can be used to effect an address re-mapping function in response to a request or negotiation process with the system 12 In this manner, a four bank memory device 22 could still be used with a system 12 that is expecting or requires a two bank memory device, for example.

In order for the system controller 12 to be able to take advantage of programmable modes in the memory module 20, the system controller 12 must be able to communicate with the module 20 to effect a mode request. In accordance with a significant aspect of the present invention, a technique is provided that allows the system controller 12 to negotiate an operating mode with the memory module 20. In the described embodiment, this negotiation is effected by the use of the presence detect function of the memory module 20.

Memory modules that use SDRAMs typically include a presence detect (PD) function. A non-volatile memory 30, such as an EEPROM, is included on the DIMM and stores a PD data field. A typical PD data field includes 256 bytes of information which are further categorized into a number of segments as follows:

| BYTE NOS. | DATA |
|---|---|
| 0–35 | Module functional and performance information |
| 36–61 | Superset data |
| 62 | SPD Revision |
| 63 | Checksum for bytes 0–62 |
| 64–127 | Manufacturer's information |
| 128–255 | Reserved for system use |

The PD data in bytes 0–35 can be used by a system controller to verify compatibility of the memory module 20 and the system requirements. The PD data can be read in serial or parallel format. Although serial PD data (SPD) is used in the exemplary embodiments herein, those skilled in the art will appreciate that the invention can be used with parallel PD data.

The information contained in bytes 0–127 is generally locked by the manufacturer after completion of the module build and test. This ensures that the data is not corrupted or overwritten at a later time.

In the embodiment of FIG. 1, the system controller 12 accesses SPD data stored in a non-volatile memory 30. The non-volatile memory 30 may be a separate memory device, such as an EEPROM, or may be a memory array that is part of the ASIC logic device 24. A suitable EEPROM with an integrated 12C bus controller (shown separately in the drawing for clarity) is a FAIRCHILD part no. NM24C03L. The system controller 12 reads the SPD data stored in the non-volatile memory 30 (via a bus 30b) by accessing the memory 30 through a standard 12C bus controller 32 and the system memory controller 14 which includes a corresponding 12C controller 14a. The 12C bus 34 is an industry standard serial bus, and the 12C bus controllers 14a, 32 can be, for example, a PHILLIPS part no. PCF8584 controller. The system 12C bus controller 14a may be located on the system motherboard or integrated into the memory controller logic 14 as in FIG. 1. The module 12C bus controller function can be and often is integrated with the non-volatile memory 30 and/or the ASIC device 24. The system controller 12 accesses the memory controller 14 across a standard bus 44.

The ASIC 24 also has access to data in the non-volatile memory 30, via a bus 30a. This is provided so that the ASIC 24 can, in some applications, be used to re-write the original PD data in the non-volatile memory 30. Furthermore, in the case where the ASIC device 24 directs PD data to be read from the volatile memory 26, the appropriate control signal, such as the 12C clock, is simply withheld from the non-volatile memory 30 by the ASIC 24.

The system memory controller 14 communicates with the module 20 via an ADDRESS AND CONTROL bus 40. This bus 40 can interface directly with the ASIC circuit 24 as illustrated, or can interface directly with the memory chips 22, as indicated by the phantom bus 42. Data flow typically is accomplished directly between the memory controller 14 and the memory chips 22 (as with the bus 48); however, in some applications, the ASIC may also be used, in addition to modifying addresses, for data formatting features, such as parity, error correction and so on to name a few examples (in which case the bus 40 could also carry data signals). The present invention, thus, is not limited in terms of how data and control signals are exchanged between the system and the module 20, but rather more generally to how the system can negotiate an address re-mapping mode of the module. Thus, although double-ended arrows are used to represent data and control flow between the ASIC 24 and the memory chips 22, this is intended to be exemplary in nature. Those skilled in the art will appreciate that the particular architecture used will depend on the actual programmable features incorporated into the memory module 20. In some applications, for example, the ASIC 24 will send address and control signals to the memory chips 22, but the data will flow directly to the memory controller 14.

In another example, control and data signals will flow directly between the memory controller 14 and the memory chips 22, but the ASIC will provide address re-mapping or other features or controls. Thus, the exact flow of signals will depend on each particular implementation, and the exemplary embodiment of FIG. 1 should not be construed in a limiting sense.

It is further noted that the various circuits indicated as discrete functional blocks, such as blocks 26, 28, 301 32 and 50, may be part of the overall ASIC device 24, as represented by the dashed box 24 around those components.

The system controller 12 initially obtains the SPD data from the non-volatile memory 30 during boot-up after the computer 10 is powered up. A power on reset (POR) operation occurs which resets logic in the memory module 20 to ensure that the preset module operation mode is initiated using the initial or original SPD data stored in the non-volatile memory 30.

It is another aspect of the invention that the system 12 can originate a negotiation of memory module 20 functions or modes "on the fly", not just during a power on sequence. Although the embodiment described herein is explained in the context of a power on or boot up sequence, this is merely for convenience of explanation, and those skilled in the art will appreciate that the techniques and apparatus described herein allow the system 12 to negotiate a module 20 mode at any time by initiating a new SPD read/write operation and subsequent new mode selection.

In order to effect a negotiation between the system 12 and the memory module 20, it is preferred but not required that the system controller 12 be able to ascertain whether the module 20 includes programmable features. It is contemplated that one of the PD data bytes, such as byte 61 in the address range for "Superset" will be designated to indicate that the memory module 20 has one or more programmable features (such as, for example, address re mapping). One reason that it may not be required to include programmable information in a PD data byte is that the system 12 can be designed to request a mode change if needed, and the logic device 24 could simply accept or reject the request based on the features available on the module 20. The use of a byte such as byte 61 to indicate programmable features could speed up the negotiation process, particularly where the module 20 does not have programmable features.

Based on the initial PD data from the non-volatile memory 30, the system controller 12 can compare the module 20 performance and operational features with the system requirements. This comparison can be effected by the system BIOS as is known. If the module 20 is compatible with the system 12 requirements, normal boot up and operation follows. If, however, the module 20 has module or device functions that are inconsistent with the system 12 requirements, and if the PD data indicates that the module 20 has one or more programmable features, then a negotiation process can be executed by the system 12. Again, the latter requirement of an affirmative indication in the PD data of programmable features is not required in order to carry out the present invention but is a preferred embodiment.

A negotiation process between the system controller 12 and the module 20 can be implemented as follows. Based on the system requirements, the system controller 12 writes or transfers modified or requested PD data to the module 20. The modified PD data corresponds with a requested operating mode or function and can be transferred by a complete PD data field write of all 255 bytes or, alternatively, the system controller 12 could write data for only the PD data entries that the system controller 12 desires to change. In either case, the modified PD data is generally transmitted to the logic device 24 by the memory controller 14 and the 12C controller 32. The ASIC logic device 24 stores the modified PD data in the volatile memory 26. A volatile memory 26 can be used to store the new PD data because, when power is removed, it will be preferred to effect a start up sequence with the "original" or initial PD data in the EEPROM 30. Thus, it is further contemplated that for a system level negotiation, modified or requested PD data will not be written to the EEPROM 30 because it is desirable not to lose the original PD data therein. But, alternative techniques for preserving the original PD data while using the non-volatile memory 30 for the modified PD data, and then re-writing the original PD data back to the memory 30, could be implemented if needed, although such a process may not be feasible in some applications.

After receiving the modified or requested PD data from the system controller 12, the ASIC logic device 24 can compare the new PD data and its corresponding modes or functions, with permitted modes or functions that are supported by the ASIC device 24. The permitted functions can be obtained, for example, from the look-up table 28, jumper wires, or PD data, for example, as previously described herein above. This process does not require a "translation" per se of PD data to corresponding functions. For example, the ASIC device 24 can be provided with a look-up table 28 or other suitable stored data format that indicates PD data values that it can support. The look-up table 28 may also store data that indicates various operational parameters of the memory chips, which data can be used to analyze additional compatibility features that might otherwise not be available from the conventional PD data and mode register functions.

In the case where the modified PD data corresponds to functions supported on the module 20, the modified or new PD data is saved in the volatile memory 26 and normal start-up and operation continues under the new mode or function. Thereafter, the ASIC logic device controls the transfer of PD data either from the non-volatile memory 30 or the volatile memory 26, depending on which memory holds the most up-to-date PD data for each PD data byte. The volatile memory 26 can be designed to store all the PD data field entries, in which case PD data transfer can occur from the volatile memory 26 alone. Alternatively, the volatile memory 26 can be used to store only the new up-to-date PD data entries, in which case the ASIC device 24 will use both the non-volatile memory 30 and the volatile memory 26 to transfer PD data to the system controller 12. In the latter case, it is contemplated that the ASIC device 24 will set a "flag" bit for each SPD address that is re-written by the system 12. This bit can then be used to direct any future "SPD READ" operations to use the PD data contained in the volatile memory 26 for those addresses.

The system controller 12 may elect to verify that the new mode or function has been entered. In this case, the system performs a READ of the new PD data to verify compatible functions are in use. In general, the system controller 12 would then initiate a power on self-test (POST) to ensure the memory module 20 is fully functional.

In the event that the module 20 is not programmable or does not have requested programmable functions supported by the ASIC logic device 24, the system controller 12 will continue the boot up process with appropriate diagnostics or other initialization processes as normally occurs when incompatible memory devices are detected during power up.

The present invention relates to effecting an address re-mapping function 50 as one example of a programmable mode 28 carried out by the ASIC 24 in response to a negotiated operating mode with the system 12. In this example, assume that the memory module 20 is a registered DIMM which includes a re-drive/flip-flop register 24a on all inputs except CLOCK and DATA. The register 24a can be integral with the ASIC 24 as in FIG. 1, or separately provided. However, the present invention can be implemented with other module 20 designs, as will be apparent to those skilled in the art. Further, assume that the module 20 includes memory devices 22 of 64 Megabit SDRAM devices that are configured as four bank devices. Finally, for this example, assume the system 12 expects or requires a memory device with two bank devices.

Figure 1A:
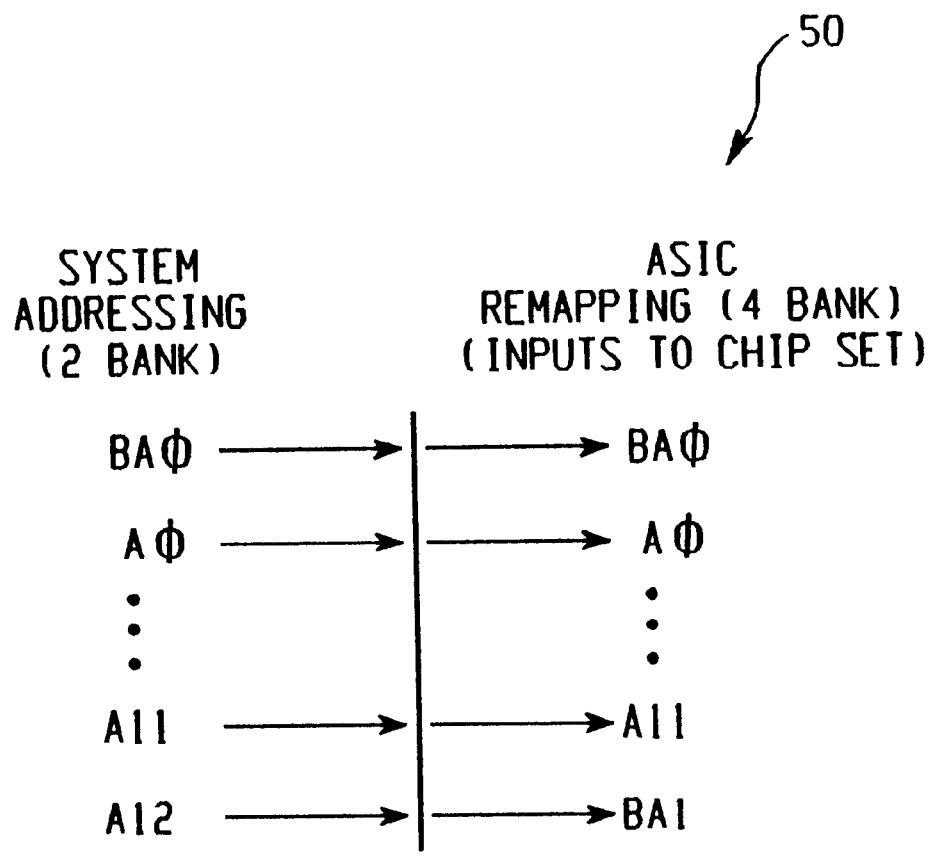
FIG. 1A illustrates an exemplary address re-mapping function carried out by the present invention.

As four bank devices, each SDRAM 22 uses twelve address signals (A0–A11) and two bank address signals (BA0 and BA1). However, the system 12 is expecting memory chips with two banks and, therefore, will address the module 20 with thirteen address signals (A0–A12) and only one bank address signal BA0, with the second bank address signal BA1 missing from the system 12 address inputs to the module 20. This is represented in FIG. 1A on the left side of the figure.

While in many instances the re-mapping function 50 is done by connecting the highest order address signal (in this case A12) to the BA1 input pin of the memory devices 22, it is possible to connect any address signal to a bank address signal. In such a case, at RAS time, twelve addresses and one bank address (A0–A11 and BA0) are provided to the SDRAM 22 in conjunction with the BA1 signal (available from the A12 system 12 address input). The ASIC 24 needs to store the BA1 address applicable to each of the BA0 options. This could be, for example, the A0 address. This allows the ASIC 24 to re-send the BA1 signal, which in this case is the latched A0 signal, at CAS time to ensure that the correct bank is addressed. The ASIC can use any convenient memory location to store the BA1 signal for CAS. Note that, in this example, no more than two of the possible four banks in the SDRAM 22 are active at once.

Note that, although the address re-mapping function 50 is illustrated as a separate functional block 50 in FIG. 1, this is for ease of description and understanding and need not represent a separate function or circuit within the module 20. The address re-mapping function 50 can be implemented as part of the addressing circuitry present in the design of the ASIC 24 for interfacing or providing the address signals to the memory device 22.

Also, it should be noted that the exemplary embodiment should not be construed in a limiting sense. The present invention can be used with many different size DRAM devices with different configurations (e.g. 2M×32, 4M×16, 8M×8, 16M×4 in the 64 Megabit example). Memory devices that contain eight banks, for example, can be used with the present invention for systems 12 expecting four bank devices (in the 64 Megabit example, the third bank address signal BA2 is provided by a re-map of the high order address A12). Thus, in one general aspect of the invention, a 2N bank memory device can be used in systems having addressing for N banks, by effecting a re-mapping of the high order address bit for the missing BA signal.

Figure 2:
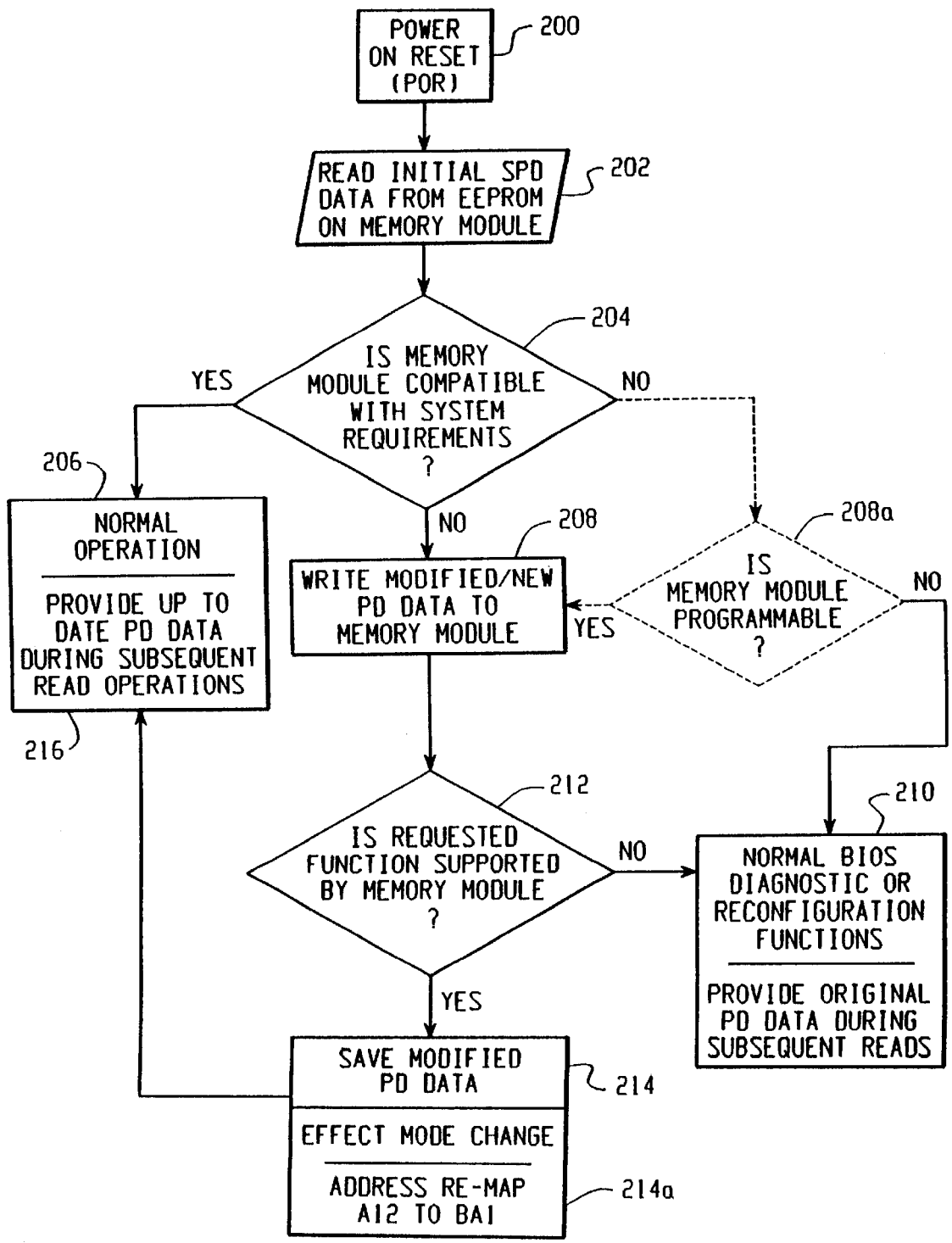
FIG. 2 is a flow chart for a negotiation process at the system level with a memory module using READ/WRITE PD data functions.

With reference to FIG. 2, a suitable control process in accordance with the invention is provided. At step 200, a POR sequence is performed to initialize the memory module 20. At step 202, the system controller 12 accesses the initial PD data stored in the non-volatile memory 30. In the described embodiment, step 202 is a serial PD READ operation via the 12C bus 34 and 12C controller 32.

At step 204, the system controller 12 determines whether the initial operating modes and functions of the memory module 20 are compatible with system level requirements. If YES, normal operation continues at step 206. If NO, the system controller 12 at step 208 writes modified or new PD data to the memory module 20, which new PD data is stored in the volatile memory 26. Shown in dashed lines on FIG. 2 is a related step 208a for systems wherein a PD data entry is used as a flag or marker to indicate to the system controller 12 whether the module 20 supports programmable functions or modes. If NO, the system enters its normal diagnostic/configuration functions at step 210.

At step 212, the ASIC logic device 24 determines whether the requested function, as indicated by the modified PD data, is supported on the memory module 20. If YES, the up-to-date PD data is stored (step 214) and provided during subsequent READ operations (step 216) during normal operation (step 206). If the requested function is not supported by the memory module 20 as determined at step 212, the system enters the normal diagnostic/configuration functions at step 210, as is the case from step 208a if the module 20 is not programmable.

Step 214 can include as part 214a the address remapping function 50 of the exemplary embodiment (of the 64 Megabit chips 22 with four banks but addressed as two bank devices). In that example, the high order address bit A12 is re-mapped to be the BAI input to the memory devices 22. This BAI input is temporarily saved for the CAS sequence and each subsequent sequence for which the ASIC 24 has to address the correct bank.

As an example of bank address re-mapping, assume that the memory module 20 is a registered DIMM which includes a re-drive/flip-flop register 24a on all inputs except CLOCK and DATA. The register 24a can be integral with the ASIC 24 as in FIG. 1, or separately provided. However, the present invention can be implemented with other module 20 designs, as will be apparent to those skilled in the art. Further assume that the module 20 includes memory devices 22 of 256 Megabit SDRAM devices that are configured as eight bank devices. Finally, for this example, assume the system 12 expects or requires a memory device with four bank devices.

Figure 1B:
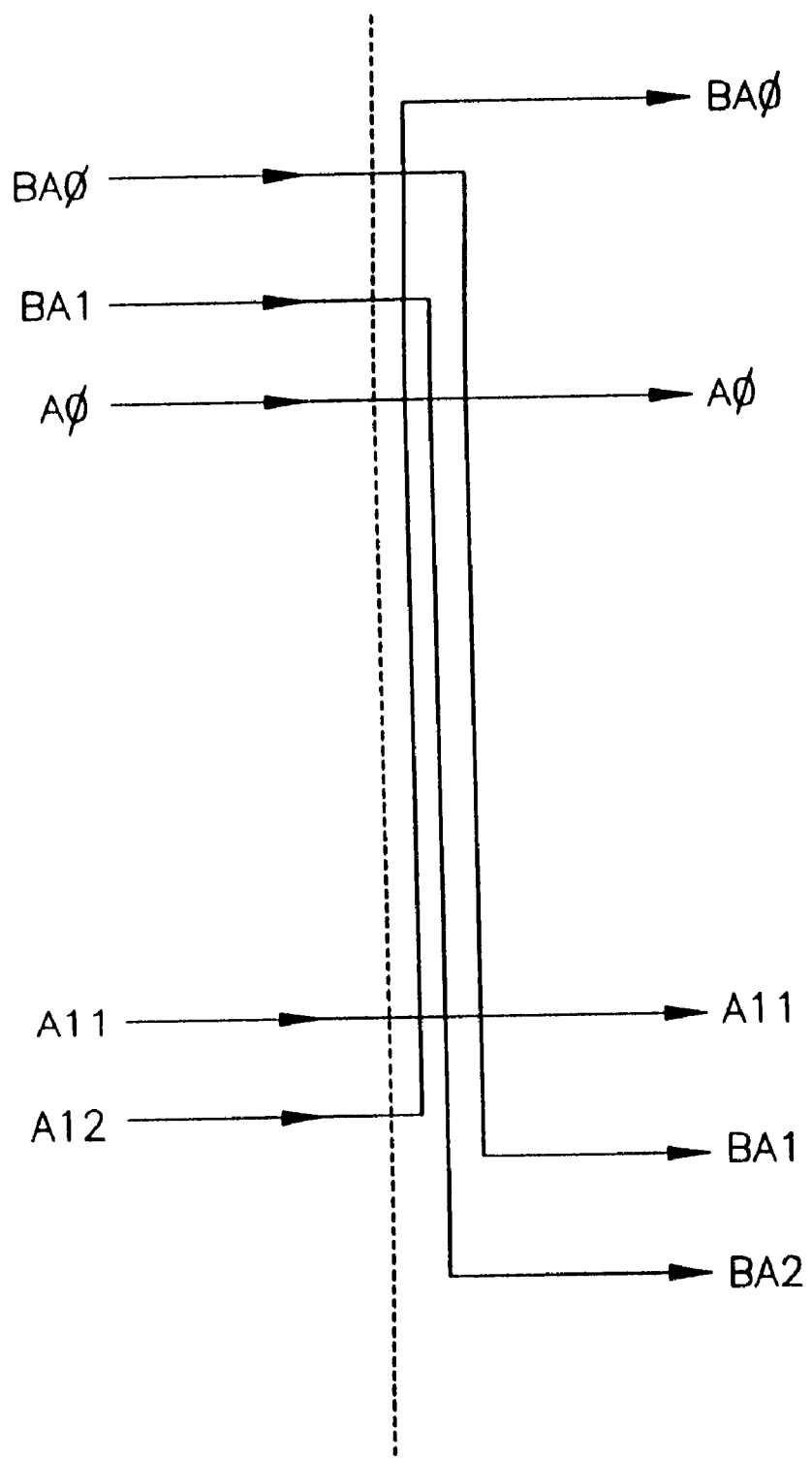
FIG. 1B illustrates another address re-mapping function carried out by the present invention.

As eight bank devices, each SDRAM 22 uses twelve address signals (A0–A11) and three bank address signals (BA0, BA1 and BA2). However, the system 12 is expecting memory chips with the four banks and, therefore, will address the module 20 with thirteen address signals (A0–A12) and only two bank address signals, BA0 and BA2, with the third bank address signal BA2 missing from the system 12 address inputs to the module 20. This is represented in FIG. 1B on the left side of the figure.

The ASIC 24 effects the address re-mapping function 50 by connecting the highest order address signal (in this case A12) to the BA0 input pin of the memory devices 22, as shown on the right side of FIG. 1A. It also connects system BA0 to device BA1, and system BA1 to device BA2. The ASIC 24 can effect this by a simple switch circuit. At RAS time, twelve addresses and two bank addresses (A0–A11 and BA1 and BA2) are provided to the SDRAM 22 in conjunction with the BA0 signal (available from the A12 system 12 address input). The ASIC 24 needs to store the BA0 address applicable to each of the BA1 and BA2 options. This allows the ASIC 24 to re-send the BA0 signal at CAS time to ensure that the correct bank is addressed. The ASIC can use any convenient memory location to store the BA0 signal for CAS. Note that in this example, no more than four of the possible eight banks in the SDRAM 22 are active at once.

The invention thus provides techniques for system level negotiation with a programmable memory module by using PD READ/WRITE functions and, in particular, an address or bank address re-mapping function.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

What is claimed is:

1. A memory module comprising: a plurality of memory devices associated with the memory module, each of said memory devices being configured in M banks, and a logic circuit for configuring the memory module to operate in a programmable addressing mode; said logic circuit receiving a number of address inputs and a number of bank address signals from a memory controller with said address inputs and bank address input signals corresponding to N bank memory devices; and are integers and can be different; the logic circuit remapping at least one of the address inputs as an additional bank address signal to the memory device; and wherein said memory module comprises a memory that stores modified PD data written by said system controller that corresponds to a requested addressing mode, and a non-volatile memory that stores initial PD data, said memory and non-volatile memory being operatively controlled by said logic circuit.

2. The apparatus of claim 1 wherein M is greater than N.

3. The apparatus of claim 2 wherein said logic circuit detects an address input from a system memory controller and re-maps and saves said address input as a bank address signal.

4. The apparatus of claim 2 wherein said logic circuit re-maps an address input into a bank address signal to provide N bank addressing using M bank SDRAM devices.

5. The apparatus of claim 1 wherein at least one of said memory devices comprises a synchronous DRAM (SDRAM) memory device.

6. A memory module comprising: a system controller; a memory module comprising: a plurality of memory devices associated with the module; each of the memory devices being configured in M banks; and a logic circuit for configuring the memory module to operate in a programmable addressing mode; the logic circuit receiving a number of address inputs and a number of bank address signals from a memory controller with the address inputs and bank address input signals corresponding to N bank memory devices; wherein M and N are integers and can be different (abstract); the logic circuit remapping at least one of the address inputs as an additional bank address signal to the memory device; and wherein said memory module comprises a memory that stores modified PD data written by said system controller that corresponds to a requested addressing mode, and a non-volatile memory that stores initial PD data, said memory and non-volatile memory being operatively controlled by said logic circuit.

7. The computer of claim 6 wherein said logic circuit re-maps addressing signals for said memory module to provide N bank addressing using M bank memory chips in said memory module.

8. A method of using an M bank memory device in a computer system that has N bank addressing, wherein M and N are integers that can be different, comprising the step of:

a) inputting address signals from a system controller to a logic circuit, said address signals including a number of address inputs and a number of bank address signals;

b) re-mapping at least one of said address inputs as an additional bank address signal or at least one bank address signal to a different device bank address; and c) providing said address signals, said bank address signals and said additional said bank address signal as inputs to the memory device; wherein said computer system includes a memory module comprising a memory that stores modified PD data written by said system controller that corresponds to a requested addressing mode, and a non-volatile memory that stores initial PD data, said memory and non-volatile memory being operatively controlled by said logic circuit.

9. A method of using an M bank memory device in a computer system that has N bank addressing, wherein M and N are integers that can be different, comprising the step of:

a) inputting address signals from a system controller to a logic circuit, said address signals including a number of address inputs and a number of bank address signals;

b) re-mapping at least one of said address inputs as an additional bank address signal or at least one bank address signal to a different device bank address; and c) providing said address signals, said bank address signals and said additional said bank address signal as inputs to the memory device; wherein said computer system includes a memory module comprising a memory that stores modified PD data written by said system controller that corresponds to a requested addressing mode, and a non-volatile memory that stores initial PD data, said memory and non-volatile memory being operatively controlled by said logic circuit.

* * * * *